3,696,051
METHOD OF REMOVING OIL FROM THE SURFACE OF WATER AND COMPOSITION THEREFOR
Robert J. McGuire, Monroeville, Edward Mitchell, Valencia, and John P. Pellegrini, Jr., Pittsburgh, Pa., assignors to Gulf Research & Development Company, Pittsburgh, Pa.
No Drawing. Filed Oct. 1, 1970, Ser. No. 77,364
Int. Cl. F23d 3/08, 21/00
U.S. Cl. 252—425.5   11 Claims

ABSTRACT OF THE DISCLOSURE

Oils floating on the surface of open bodies of water can be removed by burning them in situ in the presence of an oleophilic particulate material such as vermiculite which has been treated with a metallo cyclopentadienyl compound such as dicyclopentadienyliron.

---

This invention relates to a method of removing oil from the surface of water and to a novel composition for use in connection therewith. More particularly the present invention relates to the removal of petroleum oil floating on the surface of open bodies of water such as lakes, rivers and oceans.

The presence of petroleum oil on the surface of open bodies of water is not an occurrence of recent origin. For many years, oil slicks of a minor nature have appeared on the surface of navigational waterways without any undue alarm. Unfortunately, recent incidents giving rise to extraordinary amounts of oil on the surface of open bodies of water in close proximity to coastal areas have presented problems of growing concern to the members of the petroleum industry and to the general public.

Petroleum oil floating on the surface of open bodies of water may result from accidental spills occurring when a ship is being fueled; when a tanker is being loaded with oil; when a tanker is unloading oil; and when a tanker flounders and breaks up on high seas. In some instances, oil may appear on the surface of navigational waters when supposedly empty, oil-carrying storage tanks are flushed with water and/or when such tanks are emptied of water used as ballast. Oil slicks also may occur when leaks and blowouts are encountered during offshore drilling operations.

Once an oil spill occurs, the oil is carried by tides and currents to adjacent shore lines where it fouls beaches, kills marine animal and plant life and deleteriously affects boating, bathing and fishing. When extraordinary spills occur, an oil slick of three to four inches in depth may form initially. If this slick is not removed expeditiously, the oil spreads over the surface of the water and, in the course of several days, may cover many square miles of water surface to a depth of about 0.01 to 0.02 inch.

In the past, many methods for handling oil spills have been proposed but none has been fully satisfactory. The two primary means of handling oil spills are (1) the physical removal of the floating oil with suitably designed apparatus and/or absorbent material and (2) the dispersion of the oil within the body of water by the use of a chemical dispersant. In the physical removal of oil, various skimmers, rotating drums, endless belts and the like have been utilized. The degree of success of such mechanical means of oil removal depends to a large extent upon satisfactory containment of the oil in a confined area until such time as the apparatus can process the oil. Unfortunately, containment of the oil on the surface of rough seas has not met with much success. While the use of absorbents such as straw and sawdust coupled with physical removal of the absorbent and absorbed oil has met with some success on beaches and in relatively calm water, the degree of success is again dependent upon confinement of the oil and has met with only mild success in rough seas. Many materials absorb water equally as well as oil and thus sink to the bottom of the body of water before significant amounts of oil can be absorbed.

The use of dispersants has also met with some success in dispersing the oil but, in some instances, the dispersing agent and/or the dispersed oil can be harmful to marine plants and animals; thus, the dispersant itself creates a problem.

More recently, attempts have been made to ignite the oil floating on the surface of water but such attempts have encountered one or more difficulties. In the first place, the oil particularly if it is a heavy crude oil is difficult to ignite. Then, when the oil is ignited, continued burning thereof becomes increasingly more difficult due to evaporation and consumption by fire of the more volatile components of the oil. Furthermore, rapid heat transfer from the burning oil to the water beneath it decreases the oil temperature below its fire point making complete disposal by burning exceedingly difficult.

Still more recently, buoyant particulate materials including cellular glass nodules and fumed silica have been developed for use as wicking agents in burning away oil slicks by controlled combustion. The use of a wicking agent is advantageous in that upon ignition of the oil on the wicking agent, the wicking agent continues to feed the flame with oil by capillary attraction of the oil. Some wicking agents have another advantage in that they have insulating properties and therefore decrease the amount of heat lost to the water beneath the oil. Also, in some instances the wicking agent can be recovered for further use. While the use of a wicking agent has resulted in more effective removal of oil by the controlled combustion thereof, the prior wicking agents have not reduced the amount of smoke produced when oil is ignited and burned from the surface of water. Inasmuch as smoke per se, is a form of pollution, i.e., air pollution, the prior combustion techniques and wicking agents have not been completely satisfactory.

Among the objects achieved by the present invention is the provision of a method of removing oil from the surface of water by burning the oil in the presence of an improved wicking composition.

Another object achieved by the present invention is the provision of a new and improved wicking composition for use in burning oil from the surface of water.

Other objects achieved by this invention will become apparent in the following detailed description thereof.

We have found that oil floating on the surface of water can be removed by adding to said oil an oleophilic particulate material which has been treated with a metallo cyclopentadienyl compound, igniting the oil and burning the oil on the surface of the water until the oil is substantially completely consumed by fire. We have found further that when the oil is removed from the surface of water by combustion thereof in the presence of an oleophilic particulate material which has been treated with a metallo cyclopentadienyl compound the amount and appearance of the smoke formed is greatly improved over that obtained on burning the oil either without a wicking agent or with a wicking agent which has not been treated with a metallic cyclopentadienyl compound. After the oil has been consumed by fire, the oleophilic particulate material can be collected for reuse or can be left in the water to break up by abrasion. When collected for reuse, the oleophilic material can be treated with an additional amount of metallo cyclopentadienyl compound.

The oleophilic particulate material which we employ in the present invention can be any material which is buoyant and noncombustible and acts as a wicking agent for the oil. Examples of such materials are cellular glass nodules, vermiculite, perlite, pumice, fumed silica and the like. The characteristics of mineral particulate materials such as vermiculite and perlite, particularly in their exfoliated or expanded form, make these materials particularly useful as wicking agents in the process of the present invention. These materials are available commercially so that neither the materials per se nor the processes by which they are obtained constitute any portion of the present invention. Expanded vermiculite and perlite, for example, are obtained by subjecting vermiculite or perlite in a suitabe furnace to an expanding temperature in excess of 1000° F. Expanded perlite and vermiculite are freqeuntly obtained by allowing granules of perlite and vermiculite, respectively, to descend through and expansion zone of a furnace at a temperature within the range of about 1500° to about 2100° F. Expanded vermiculite and perlite thus obtained has a bulk density of about 4 to 10 pounds per cubic foot.

While vermiculite and perlite in their exfoliated or expanded forms are particularly useful and economical wicking agents, these materials although initially buoyant have a tendency to absorb water in rough seas if ignition of the oil does not take place within a relatively short time after they have been added to the oil floating on the surface of the water. Thus, when it is anticipated that more than several hours will elapse between adding an oleophilic mineral particulate material such as vermiculite or perlite on the surface of the oil and igniting the oil, we prefer to utilize an oleophilic mineral particulate material which has been rendered hydrophobic by treatment with a water repellant such as asphalt, wax, zinc sterate, silicone, methylchlorosilane, dimethylchlorosilane, trimethylchlorosilane, phenyltrichlorosilane and the like to render the particulate material hydrophobic. The use of a petroleum material such as asphalt or wax as the water repellent is desirable in that it further enhances the oleophilic characteristics of the particulate material. In order to render materials such as vermiculite and perlite essentially hydrophobic, they are impregnated with about 0.25 to about 5.0 percent by weight of the water repellent based on the weight of the material to be waterproofed.

The formation of water repellent coatings on particulate materials used in the invention can be accomplished by any suitable technique such as by spraying the water repellent or solution or suspension thereof on the particulate materials or by immersing the particulate material in the water repellent or solution or suspension thereof and thereafter recovering the solvent. According to one embodiment a particulate material is heated and thereafter contacted with an aqueous emulsion of the water repellent in a vessel under conditions such that the water of the emulsion is flashed off and the water repellent either absorbed or adsorbed by the particulate material which is thereby rendered hydrophobic. In U.S. Patent No. 2,824,022 which issued Feb. 18, 1958 to Glenn Sucetti, a process is described wherein a particulate material such as vermiculite or perlite is first expanded by passing granules of the material through an expanding zone at a temperature in excess of 1000° F. The expanded particulate material upon cooling to a temperature of about 600° to about 800° F. is contacted with an aqueous emulsion of a suitable water-resistant material such as an aqueous emulsion of asphalt. When the aqueous emulsion of asphalt contacts the hot particulate material, the water contained in the emulsion is converted to steam which aids in forming a continuous, uniformly thin coating of asphalt on the particulate material. The coating thus formed is generally less than about 10 microns in thickness. The amount of asphalt deposited on the particulate material is less than about 1 percent by weight based on the weight of the particulate material.

The particle size of the oleophilic material can vary over a wide range. While solids having an average particle diameter of 10 m$\mu$ ($4 \times 10^{-7}$ inch) or less can be employed, the particle size is usually within the range of about 0.005 to 1.0 inch with a range of about 0.01 to 0.5 inch being preferred. The preferred range permits uniform spreading of the flame from the point of ignition to the remaining surface of the oil slick. Suitable cellular glass nodules for purposes of the invention have a typical average diameter of about 0.25 inch. Commercially available materials of this type are sold under the trade name "SeaBeads" by Pittsburgh Corning Company. Suitable fumed silica for purposes of the invention may consist of extremely fine particles, i.e., $4 \times 10^{-7}$ inch or smaller. Commercially available materials of this type are sold under the trade name "Cab-O-Sil ST-2-O" by Cabot Corporation. "Cab-O-Sil ST-2-O" is a fluffy powder composed of extremely fine particles of fumed silica surface-treated with a silane coating to render it hydrophobic. "Cab-O-Sil ST-2-O" has a bulk density of about 2 to 3 pounds per cubic foot. Vermiculite which is suitable for purposes of the invention is preferably expanded vermiculite comprising a mixture of particles ranging in size from about 0.01 to 0.25 inch. Perlite which is suitable for use in the invention comprises a mixture of particles ranging in size from about 0.01 to 0.25 inch.

The oleophilic particulate material which has been treated with a metallo cyclopentadienyl compound is applied to the oil slick in an amount sufficient to substantially cover the entire slick. Naturally, more of the treated oleophilic particulate material is required to cover an oil slick extending over several square miles than an oil slick which extends only over several square yards. Thus, the amount of the particulate material employed is not as dependent upon the weight or volume of the oil in the slick as it is on the area over which the oil has spread.

The metallo cyclopentadienyl compound which we employ in accordance with the invention can be illustrated by the following structural formulae:

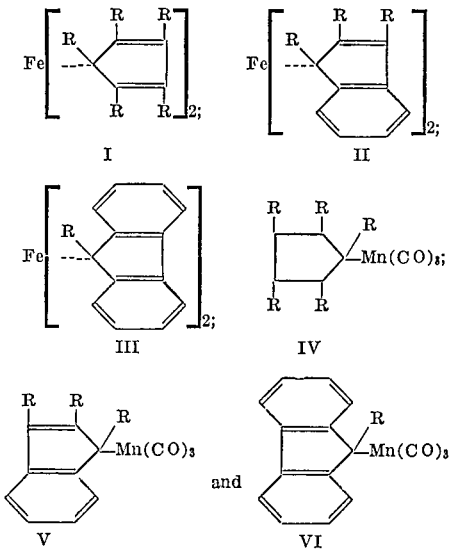

wherein R is a substitutent selected from the group consisting of hydrogen, alkyl, alkenyl, cycloalkyl and aryl radicals. The R substituents in the above formulae may be either the same or different substituents. Preferred compounds are those wherein the R substituents are either hydrogen or lower alkyl radicals.

The above-illustrated metallo cyclopentadienyl compounds are iron and manganese derivatives of cyclopentadiene, indene, fluorene and hydrocarbyl-substituted cyclopentadienes, indenes and fluorenes wherein the metal is bonded to the cyclopentadiene group or groups by carbon to metal bonds through carbon of the cylopentadiene group or groups.

Specific examples of some of the cyclopentadienes from which useful iron and manganese cyclopentadienyls can be made are cyclopentadiene;
methylcyclopentadienes;
dimethylcyclopentadienes;
trimethylcyclopentadienes;
tetramethylcyclopentadienes;
pentamethylcyclopentadiene;
ethylcyclopentadienes;
methyl, ethylcyclopentadienes;
n-propylcyclopentadienes;
isopropylcyclopentadienes;
propenylcyclopentadienes;
methyl, propylcyclopentadienes;
n-butylcyclopentadienes;
sec-butylcyclopentadienes;
tert-butylcyclopentadienes;
isobutylcyclopentadienes;
amylcyclopentadienes;
cyclopentylcyclopentadines;
cyclohexylcyclopentadienes;
phenylcyclopentadienes;
diphenylcyclopentadienes; and
pentaphenylcyclopentadiene.

Examples of compounds having Formula I are dicyclopentadienyliron;
bis(methylcyclopentadienyl)iron;
bis(ethylcyclopentadienyl)iron;
bis-[2-ethylphenyl)cyclopentadienyl]iron;
bis(tert-butylcyclopentadienyl)iron;
bis(1-methyl-2-ethylcyclopentadienyl)iron;
bis(cyclohexylcyclopentadienyl)iron;
bis(phenylcyclopentadienyl)iron and
bis(diphenylcyclopentadienyl)iron.

Examples of compounds having Formula II are bisindenyliron;
bis(methylindenyl)iron;
bis(1,3-dimethylindenyl)iron;
bis(trimethylindenyl)iron;
bis(ethylindenyl)iron;
bis(cyclohexylindenyl)iron;
bis(phenylindenyl)iron and
bis(triphenylindenyl)iron.

Examples of compounds having Formula III are bisfluorenyliron;
bis(methylfluorenyl)iron;
bis(ethylfluorenyl)iron;
bis(n-butylfluorenyl)iron;
bis(tert-butylfluorenyl)iron;
bis(cyclohexylfluorenyl)iron; and
bis(phenylfluorenyl)iron.

Examples of compounds having Formula IV are cyclopentadienyl manganese tricarbonyl
methylcyclopentadienyl manganese tricarbonyl
ethylcyclopentadienyl manganese tricarbonyl
n-propylcyclopentadienyl manganese tricarbonyl
isopropylcyclopentadienyl manganese tricarbonyl
propenylcyclopentadienyl manganese tricarbonyl
n-butylcyclopentadienyl manganese tricarbonyl
sec-butylcyclopentadienyl manganese tricarbonyl
tert-butylcyclopentadienyl manganese tricarbonyl
isobutylcyclopentadienyl manganese tricarbonyl
butenylcyclopentadienyl manganese tricarbonyl
amylcyclopentadienyl manganese tricarbonyl
cyclopentylcyclopentadienyl manganese tricarbonyl
cyclohexylcyclopentadienyl manganese tricarbonyl
heptylcyclopentadienyl manganese tricarbonyl
1,3-dimethylcyclopentadienyl manganese tricarbonyl
pentamethylcyclopentadienyl manganese tricarbonyl
1,3-dimethyl-2,4-di-tert-butylcyclopentadienyl manganese tricarbonyl
1,3-diphenylcyclopentadienyl manganese tricarbonyl Examples of compounds having Formula V are indenyl manganese tricarbonyl; methylindenyl manganese tricarbonyl; 1,3-dimethylindenyl manganese tricarbonyl; trimethylindenyl manganese tricarbonyl; ethylindenyl manganese tricarbonyl; 1,3-diethylindenyl manganese tricarbonyl; cyclohexylindenyl manganese tricarbonyl; phenylindenyl manganese tricarbonyl; and triphenylindenyl manganese tricarbonyl.

Examples of compounds having Formula VI are fluorenyl manganese tricarbonyl; methylfluorenyl manganese tricarbonyl; ethylfluorenyl manganese tricarbonyl; propylfluorenyl manganese tricarbonyl; n-butylfluorenyl manganese tricarbonyl; tert-butylfluorenyl manganese tricarbonyl; cyclohexylfluorenyl manganese tricarbonyl; and phenylfluorenyl manganese tricarbonyl.

Preferred compounds useful according to the invention are dicyclopentadienyliron; bis(methylcyclopentadienyl) iron; cyclopentadienyl manganese tricarbonyl; and methylcyclopentadienyl manganese tricarbonyl.

The metallo cyclopentadienyl compounds employed in accordance with the invention can be prepared in various ways. Neither the compounds per se nor the processes by which they are made constitute any portion of the invention. For example, dicyclopentadienyliron can be prepared by passing a mixture of cyclopentadiene and nitrogen over a reduced iron catalyst at 300° C. This method, however, requires frequent reactivation of the catalyst. This process has been disclosed by S. A. Miller, J. A. Tebboth and J. F. Tremaine, Journal of The Chemical Society, 632, February 1952. Another method of preparing dicyclopentadienyliron comprises a Grignard synthesis starting with cyclopentadiene, ethyl magnesium bromide and ferric chloride. This method for the preparation of dicyclopentadienyliron has been disclosed by T. J. Kealy and P. L. Pauson in Nature, 168, 1039 (1951). Dicyclopentadienyliron and a process for preparing same by reacting cyclopentadienyl magnesium bromide with anhydrous ferric chloride are disclosed in U.S. Pat. No. 2,680,756 which issued June 8, 1954 to P. L. Pauson.

Methylcyclopentadienyl manganese tricarbonyl and similarly substituted cyclopentadienylmanganese tricarbonyls can be prepared, for example, by reacting the corresponding bis(cyclopentadienyl)manganese compound with carbon monoxide. According to another method, dimeric manganese pentacarbonyl is heated with cyclopentadiene or a substituted cyclopentadiene at 100° to 300° C. According to a further method, cyclopentadienyl manganese carbonyl compounds are alkylated in the presence of a Friedel-Crafts catalyst. Cyclopentadienyl manganese tricarbonyl and a process for preparing the same are disclosed in U.S. Pat. No. 2,818,417 which issued Dec. 31, 1957 to J. S. Brown, H. Shapiro and E. G. De Witt. According to said patent, cyclopentadiene is reacted with sodium in the presence of tetrahydrofuran to form sodium cyclopentadiene. The sodium compound is then reacted with anhydrous manganese chloride to form bis (cyclopentadienyl)manganese. The latter compound is then reacted with carbon monoxide under pressure to produce cyclopentadienyl manganese tricarbonyl. The methyl and ethyl derivatives are similarly prepared starting with methylcyclopentadiene and ethylcyclopentadiene, respectively, instead of cyclopentadiene. Indenyl and fluorenyl manganese tricarbonyl are similarly prepared starting with indene and fluorene, respectively, instead of cyclopentadiene.

The metallo cyclopentadienyl compound which is used to treat the particulate material can be applied to the particulate material by any suitable method such as by spraying a solution or suspension of the cyclopentadienyl compound on the particulate material or by immersing the particulate material in a solution or suspension of the cyclopentadienyl compound. After treating the particulate material with a solution or suspension of the metallo cyclopentadienyl compound, the solvent or dispersing medium is removed by conventional evaporation techniques. Suitable solvents or dispersing media for use in forming solutions or suspensions of the metallo cyclopentadienyl compound include ordinary organic solvents such as benzene, toluene, aliphatic hydrocarbons, alcohols, ethers, water and the like. In some instances, the metallo cyclopentadienyl compound can merely be admixed with the particulate material without employing a solvent. If the oleophilic particulate material is treated with a water repellent, the water repellent can be applied either before or after treating with the metallo cyclopentadienyl compound. If desired, the water repellent and the metallo cyclopentadienyl compound can be added to the oleophilic particulate material simultaneously as, for example, by the use of an emulsion containing asphalt and a suitable metallo cyclopentadienyl compound.

The amount of the metallo cyclopentadienyl compound applied to the oleophilic particulate material may vary depending upon the burning characteristics of the oil to be removed from the surface of the water. In general, the metallo cyclopentadienyl compound comprises about 0.001 to about 10 percent by weight of the particulate material. In any event, the metallo cyclopentadienyl compound is present on the oleophilic material in an amount sufficient to reduce the amount and improve the appearance of the smoke produced on burning the oil on the surface of water.

In applying the oleophilic particulate material which has been treated with the metallo cyclopentadienyl compound to the oil on the surface of the water, any suitable means can be utilized. Thus, for example, the treated oleophilic particulate material can be applied to an oil slick on high seas either from a boat or from the air using an airplane or helicopter. The manner in which these materials are added to the oil slick can be in any convenient way such as by hand or by automatic spraying and/or spreading devices.

The oil to which the particulate material has been applied can be ignited in various ways as with a blowtorch, flame thrower or other incendiary device. According to one embodiment, ignition can be accomplished by saturating a piece of cloth with kerosene, dropping the kerosene-treated cloth onto the oil surface to which the particulate material has been applied, and then igniting the cloth. The flame front travels from the cloth to the oil immediately adjacent to the cloth. The flame thereafter travels over the entire surface of the oil slick whereupon combustion of the oil continues due to the wicking action of the particulate material until the slick is consumed by fire.

After the oil has been consumed by fire, the residue comprising the oleophilic solid material can be collected for reuse or left in the water for eventual destruction by abrasion. If collected for reuse, the oleophilic solid can be further treated with the metallo cyclopentadienyl compound inasmuch as this material is generally consumed by the fire.

The petroleum oil which can be removed from the surface of water in accordance with the invention includes unrefined crude oil and refined crude oil products such as bunker oil, gas oil, furnace oil, lubricating oil, kerosene, etc.

The following examples are presented for purposes of illustrating the present invention and are not to be regarded as limiting the same.

EXAMPLE I

In this series of experiments, a comparison is made between the burning of a layer of Kuwait crude oil floating on the surface of synthetic seawater with and without wicking agents. The wicking agents employed are expanded vermiculite, expanded vermiculite treated with dicyclopentadienyl iron and cellular glass nodules treated with dicyclopentadienyliron. The seawater is made by mixing certain salts in appropriate amounts with water. The salts and proportions used are 25.0 g. NaCl; 11.0 g. $MgCl_2 \cdot 6H_2O$; 4.0 g. $Na_2SO_4$ and 1.16 g. $CaCl_2$ per liter of resulting solution.

Experiment 1

In this experiment, 110 ml. of Kuwait crude oil is placed on about 1200 ml. of synthetic seawater in a Coors porcelain evaporating dish (230 mm. diam. at top). The thickness of the oil layer is about 1/8 inch. The crude oil is ignited with a bunsen burner. Only about 50 percent of the oil is burned. During the burning of the oil, a voluminous amount of black smoke is given off.

Experiment 2

The procedure of Experiment 1 is repeated except the surface of the crude oil is covered with expanded vermiculite having a bulk density of about 4 to about 8 pounds per cubic foot (particle size of about 0.02 to about 0.2 inch). The oil is ignited with a bunsen burner immediately after the verimculite has been added. Upon ignition, the oil layer burns until more than 98% of the oil is consumed by the fire. During the burning of the oil, the density of the smoke is about the same as in Experiment 1.

Experiment 3

In this experiment, expanded vermiculite is treated with about 8 percent by weight of dicyclopentadienyliron before the vermiculite is placed on the crude oil. Treating of the vermiculite with dicyclopentadienyliron is accomplished by adding a solution of 1.6 g. of dicyclopentadienyliron in 50 ml. of a solvent consisting of equal volumes of n-pentane and benzene to 20 grams of expanded vermiculite and thereafter allowing the solvent to evaporate. Seven grams of the treated vermiculite thus obtained containing about 8 percent by weight of dicyclopentadienyliron are placed on the surface of the crude oil (90 ml.) which, in turn, is floating on 1200 ml. of synthetic seawater in the evaporating dish. Upon ignition, the oil layer burns until more than 98% of the oil is consumed by the fire. During the burning of the oil, the smoke is gray and is about 85% less than that given off in Experiment 2.

Experiment 4

In this experiment, "SeaBeads" obtained from Pittsburgh Corning Company comprising cellular glass nodules having an average diameter of about 0.25 inch are treated with about 9 percent of dicyclopentadienyliron before the glass nodules are placed on the crude oil. Treating of the glass nodules is accomplished by immersing the "SeaBeads" in a solution containing 15 to 20 grams of dicyclopentadienyliron per 100 grams of benzene. The excess solution is removed by filtration and the coated "SeaBeads" are dried in a stream of air. Seven grams of the treated glass nodules thus obtained containing about 9 percent by weight of dicyclopentadienyliron are placed on the surface of the crude oil (90 ml.) which is floating on 1200 ml. of synthetic seawater in the evaporating dish. Upon ignition, the oil layer burns until more than 98% of the oil is consumed by the fire. During the burning of the oil, the smoke is gray and is about 75% less than that given off in Experiment 2.

EXAMPLE II

In this series of experiments a comparison is made between the use of vermiculite coated with asphalt to make it hydrophobic, untreated vermiculite and asphalt-coated vermiculite further treated with dicyclopentadienyliron. A comparison is also made in the lapse of time, i.e., 6 hours and 22 hours after adding untreated vermiculite.

Experiment 1

In this experiment, 7 grams of expanded vermiculite having a bulk density of about 6 pounds per cubic foot (particle size about 0.02 to about 0.2 inch) are placed on the surface of Kuwait crude oil (90 ml.) which, in turn, is floating on 1200 ml. of synthetic seawater in a Coors porcelain evaporating dish as described in Example I hereinabove. The contents of the evaporating dish are permitted to remain quiescent for about 6 hours. Thereafter, the oil layer is ignited. Upon ignition, the oil layer burns until more than 98% of the oil is consumed by the fire. During the burning of the oil, a voluminous amount of black smoke is given off.

Experiment 2

The procedure of Experiment 1 is repeated except the contents of the evaporating dish are permitted to remain quiescent for about 22 hours before the oil is ignited. It is noted that the vermiculite becomes partially saturated with water and oil and does not sustain combustion.

Experiment 3

The procedure of Experiment 2 is repeated except the expanded vermiculite is treated with about 1 percent by weight of asphalt prior to being placed on the surface of the Kuwait crude oil. Treating of the vermiculite with asphalt is accomplished by contacting the expanded vermiculite heated to a temperature of about 600° to about 800° F. with an aqueous emulsion of asphalt (16.7 percent by volume of a 50–60 penetration asphalt). The treated vermiculite thus obtained contains about 1 percent by weight of asphalt. The asphalt-coated vermiculite has a bulk density of about 5 to 7 pounds per cubic foot. After allowing the contents of the evaporating dish to remain quiescent for about 22 hours, the oil layer is ignited. Upon ignition of the crude oil, the oil layer burns until more than 98% of the oil is consumed by fire. During the burning of the oil, a voluminous amount of black smoke is given off.

Experiment 4

The procedure of Experiment 3 is repeated except the vermiculite which has been treated with asphalt is further treated with about 8 percent by weight of dicyclopentadienyliron before the asphalt-treated vermiculite is placed on the crude oil. Treating of the asphalt-coated vermiculite with dicyclopentadienyliron is accomplished by adding a solution of 1.6 g. of dicyclopentadienyliron in 50 ml. of a solvent consisting of equal volumes of n-pentane and benzene to 20 grams of the asphalt-coated vermiculite. Thereafter the solvent is allowed to evaporate from the treated vermiculite. After the contents of the evaporating dish are permitted to remain quiescent for about 22 hours, no noticeable settling of the asphalt-coated vermiculite which has been treated with dicyclopentadienyliron is observed. Thereafter, upon ignition of the crude oil, more than about 98% of the oil is consumed by fire. During the burning of the oil, a small amount of gray smoke is given off.

EXAMPLE III

Equivalent results are achieved when the experiments reported hereinabove are repeated employing other oleophilic particulate materials such as expanded perlite, pumice and fumed silica in place of the glass nodules and expanded vermiculite. Oil which is burned on the surface of water in the presence of an oleophilic particulate material and dicyclopentadienyliron is consumed with the emission of less smoke than that encountered in burning in the absence of dicyclopentadienyliron.

EXAMPLE IV

Equivalent results are achieved when the experiments reported hereinabove are repeated employing other metallo cyclopentadienyl compounds such as bis(methylcyclopentadienyl)iron; bis(ethylcyclopentadienyl)iron; bis[(2-ethylphenyl)cyclopentadienyl]iron; bis(tert - butylcyclopentadienyl)iron; bisindenyliron; bisfluorenyliron; cyclopentadienyl manganese tricarbonyl; methylcyclopentadienyl manganese tricarbonyl; ethylcyclopentadienyl manganese tricarbonyl; tert-butylcyclopentadienyl manganese tricarbonyl; indenyl manganese tricarbonyl and fluorenyl manganese tricarbonyl.

While our invention has been described with reference to various specific examples and embodiments, it will be understood that the invention is not limited to such examples and embodiments and may be variously practiced within the scope of the claims hereinafter made.

We claim:

1. A wicking composition for burning oil from the surface of water comprising a noncombustible, buoyant, oleophilic particulate material from the group consisting of cellular glass nodules, vermiculite, perlite, pumice, and fumed silica, containing about 0.001 to about 10 percent by weight based on the weight of the particulate material of a metallo cyclopentadienyl compound selected from the group having the following structural formulae

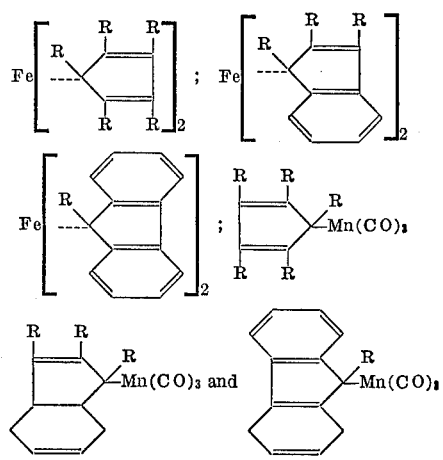

wherein R is a substituent selected from the group consisting of hydrogen, alkyl, alkenyl, cycloalkyl and aryl radicals.

2. The wicking composition of claim 1 wherein the oleophilic particulate material is cellular glass nodules.

3. The wicking composition of claim 1 wherein the oleophilic particulate material is expanded vermiculite.

4. The wicking composition of claim 3 wherein the vermiculite has been treated with a water repellent to render it hydrophobic.

5. The wicking composition of claim 4 wherein the water repellent is asphalt.

6. The wicking composition of claim 1 wherein the metallo cyclopentadienyl compound is dicyclopentadienyliron.

7. The wicking composition of claim 1 wherein the metallo cyclopentadienyl compound is bis(methylcyclopentadienyl)iron.

8. The wicking composition of claim 1 wherein the metallo cyclopentadienyl compound is cyclopentadienyl manganese tricarbonyl.

9. The wicking composition of claim 1 wherein the metallo cyclopentadienyl compound is methylcyclopentadienyl manganese tricarbonyl.

10. A wicking composition for burning oil from the surface of water comprising expanded vermiculite containing about 0.001 to about 10 percent by weight based on the weight of the vermiculite of dicyclopentadienyliron.

11. A wicking composition for burning oil from the surface of water comprising expanded vermiculite which has been rendered hydrophobic by treatment with asphalt and which contains about 0.001 to about 10 percent by weight based on the weight of the vermiculite of dicyclopentadienyliron.

References Cited

UNITED STATES PATENTS

| | | | |
|---|---|---|---|
| 3,556,698 | 1/1971 | Tully et al. | 431—2 |
| 2,464,204 | 3/1949 | Baker | 117—100 S |
| 3,338,691 | 8/1967 | Knowles et al. | 44—40 |
| 3,294,685 | 12/1966 | Stevens et al. | 44—7.5 |
| 2,807,524 | 9/1957 | Tench | 44—7.5 |
| 3,185,718 | 5/1965 | Brown et al. | 44—7.5 |
| 2,818,417 | 12/1957 | Brown et al. | 44—68 |
| 3,112,789 | 12/1963 | Percy et al. | 431—4 |
| 3,348,932 | 10/1967 | Kukin | 44—68 |

DANIEL E. WYMAN, Primary Examiner

P. E. KONOPKA, Assistant Examiner

U.S. Cl. X.R.

117—100. S, 123. D, 168; 210—Dig. .021, 36, 40; 252—430, 431; 431—2